Figure 1:
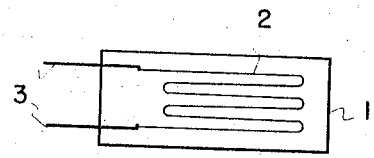

Feb. 21, 1967  TOSHIO DOI  3,305,816
TERNARY ALLOY STRAIN GAUGE
Filed Jan. 27, 1965

INVENTOR.
Toshio Doi
BY
H. Edward Mestern

United States Patent Office 3,305,816
Patented Feb. 21, 1967

3,305,816
TERNARY ALLOY STRAIN GAUGE
Toshio Doi, Tokyo-to, Japan, assignor to Kabushiki Kaisha Hitachi Seisakusho, Tokyo-to, Japan, a joint-stock company of Japan
Filed Jan. 27, 1965, Ser. No. 428,430
Claims priority, application Japan, Feb. 8, 1964, 39/6,478
3 Claims. (Cl. 338—2)

This invention relates to mechano-electrical strain gauges commonly called resistance strain gauges and more particularly to a new mechano-electrical strain gauge made of a ternary alloy of platinum, palladium, and iridium having highly desirable characteristics.

More specifically, it is a general object of the invention to provide a mechano-electrical strain gauge having a high gauge factor and other excellent characteristics and having low deviations of characteristics among individual products of the same specification.

Strain gauges of the type herein considered (hereinafter referred to as "strain gauges"), whereby strains (or displacements) are measured through utilization of variations of electrical resistance of gauge filament due to strain (or displacement) are not only widely used for strain measurements, in general, but in recent years have been utilized as mechanical-to-electrical transducer elements of industrial instruments such as self-balancing recorders.

More specifically, strain gauges of this character are composed of fine metal wires or metal foils arranged in grid form, and the variations in their resistances when they are bonded onto an object to be measured and are subjected to strain are utilized. The sensitivity of such a strain gauge is determined by its gauge factor GF, which may be expressed by the following equation.

$$GF = (1+2\nu) + (\Delta\rho/\rho)/(\Delta l/l)$$

where:
$\nu$ is the Poisson's ratio of the gauge filament material;
$\rho$ is the electrical resistivity of the gauge filament material; and
$l$ is the gauge filament length.

Since Poisson's ratio $\nu$ is approximately 0.3 for metals, the quantity $(\Delta\rho/\rho)/(\Delta l/l)$ must be made large in order to obtain a large value of GF.

The prime requirements for a strain gauge of this type are a large gauge factor, little or no variation of gauge factor with temperature, and excellent linearity. Other principal requirements are: high resistivity; low temperature coefficient of electrical resistance; high proportional limit; homogeneity; low rate of change with passage of time; low hysteresis characteristic; good workability, particularly for working into thin material; good mechanical properties; capability of being easily soldered and brazed; and resistance against oxidation and corrosion.

Measured results of gauge factors, temperature coefficients of resistance, and resistivity of typical examples of strain gauge materials used at present are shown in Table 1.

TABLE 1

| Material | Gauge Factor (GF) | Temp. Coeff. of Resistance, $C_t$ ($\times 10^{-6}/°$ C.) | Resistivity, $\rho$ ($\mu\Omega$-cm.) |
|---|---|---|---|
| Cu-Ni | 2.12<br>2.1<br>2.12<br>2.05<br>2.04 | ±20 | 43–49 |
| Iso-Elastic | 3.56<br>3.53<br>3.6<br>3.6 | 470 | 80 |
| Ni-Cr | 2.55<br>2.1<br>2.63 | ±20 | 100–140 |
| Manganine | 0.47<br>0.5<br>0.47 | ±20 | 40–45 |
| Monel | 1.9 | 2,000 | 48 |
| Pt | 4.12 | 3,000 | 25 |

Of the materials listed in Table 1, the most widely used material is Cu-Ni alloy. Although this allow has a substantially low temperature coefficient of resistance and high resistivity, its gauge factor is of the order of 2, and deviations of the properties of products made therefrom within one production lot or among different lots are as high as 5 to 10 percent. Furthermore, this alloy has the serious disadvantage of low resistance against oxidation and corrosion because it is an alloy of base metals. As a measure to overcome this disadvantage, alloys of noble metals also used, but no alloy has yet been found, as far as I am aware, which fully satisfies the aforementioned requirements.

The present invention contemplates overcoming the above stated difficulties.

According to the present invention there is provided a strain gauge formed from wire or foil made of a ternary alloy of platinum, palladium, and iridium, said strain gauge having a gauge factor of 4 or more, a relatively low temperature coefficient of resistance, a relatively high resistivity, and other characteristics superior to those of known strain gauges, and having, moreover, low deviation of characteristics among individual products of the same specification.

Figure 2:
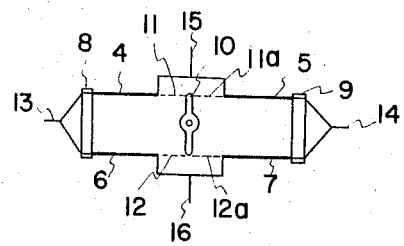

The nature and details of the invention will be more clearly apparent from the following description with respect to preferred embodiments thereof, when read in conjunction with the accompanying drawing, in which:

FIGURE 1 is a planar view showing one embodiment of the strain gauge according to the invention; and FIGURE 2 is a diagram showing an application of another embodiment of the strain gauge of the invention.

Referring to FIGURE 1, the strain gauge shown therein is a single grid gauge of the adhesion type in which a thin metal wire is used. The gauge comprises essentially a gauge base 1 consisting of an insulating, flexible film such as, for example, paper, bakelite-impregnated paper, or polyester sheet, a gauge filament 2 bonded to the gauge base 1, and lead wires 3.

FIGURE 2 shows an example of a non-adhesion type strain gauge of a bridge arrangement. This gauge comprises essentially four gauge filaments 4, 5, 6, and 7, filament holders 8 and 9, a movable member 10 capable of rotating when directly coupled, for example, to a servomotor which is not shown, means 11 and $11_a$ and means 12 and 12ₐ for transmitting the rotation of the movable member 10 to the gauge filaments 4, 5, 6, and 7, and lead wires 13, 14, 15, and 16.

Results of measurement of tensile strength, resistivity, temperature coefficient of resistance, and gauge factor of each of several alloys suitable for use in the strain gauge of the invention are shown in Table 2. The samples used for these measurements were cold worked 75 percent and then vacuum annealed at 600 degrees C. for 30 minutes.

TABLE 2

| Composition (Atomic Percent) | | | Tensile Strength (kg./mm.²) | Resistivity ($\mu\Omega$-cm.) | Temp. Coeff. of Resistance, $C_f$ ($\times 10^{-4}/°$ C.) | Gauge Factor |
|---|---|---|---|---|---|---|
| Pt | Pd | Ir | | | | |
| 47.5 | 47.5 | 5 | 60 | 36.5 | 7.2 | 4.2 |
| 45 | 45 | 10 | 60 | 41.5 | 5.5 | 4.2 |
| 60 | 20 | 20 | 68 | 40.0 | 5.2 | 4.2 |
| 40 | 40 | 20 | 65 | 46.8 | 3.6 | 4.2 |
| 20 | 60 | 20 | 102 | 49.8 | 3.2 | 4.3 |
| 28 | 52 | 20 | 80 | 47.5 | 3.1 | 4.2 |
| 24 | 46 | 30 | 110 | 49.7 | 2.5 | 4.3 |

As can be observed from Table 1, the gauge factor in all cases was above 4, and the tensile strength was approximately 60 to 110 kg./mm.², which is considerably high. At the same time, it was found that the workability was relatively good, the alloys being capable of being worked into thin wires. The resistivity was approximately from 30 to 50$\mu\Omega$-cm., which is approximately of the order of that of a Cu-Ni alloy.

It is to be observed further that almost all of the values of temperature coefficient of resistance are below $1 \times 10^{-3}/°$ C. If the temperature coefficient of resistance is approximately $1 \times 10^{-3}/°$ C., the temperature coefficient of resistance of the entire system can be decreased by using a suitable compensation circuit. Furthermore, by using a suitable elastic material (coefficient of expansion $\alpha_s$) corresponding to the coefficient of expansion $\alpha_f$, the temperature coefficient of resistance $C_f$, and the gauge factor GF of the present gauge, the following relationship can be attained.

$$(\Delta R/R)_t = (\alpha_s - \alpha_f)GF\Delta T + C_f\Delta T = O$$

Since these alloys are those of noble metals, they have excellent resistance against oxidation and corrosion and can be readily soldered and brazed. Moreover, by exercising care in the heat treatment of these alloys, it is possible to reduce greatly variations in properties with the passage of time as in the case of other metal materials.

Deviations of the temperature coefficient of resistance of certain alloy samples after they have been formed into foil and assembled into strain gauges are indicated in Table 3.

TABLE 3

| Composition (Atomic Percent) | | | Lot No. | Temp. Coeff. of Resistance, $C_f$ ($\times 10^{-6}/°$ C.) |
|---|---|---|---|---|
| Pt | Pd | Ir | | |
| 20 | 60 | 20 | 1 | 320 |
| | | | 2 | 320 |
| | | | 3 | 320 |
| | | | 4 | 319 |
| | | | 5 | 320 |
| 60 | 20 | 20 | 1 | 519 |
| | | | 2 | 520 |
| | | | 3 | 520 |
| | | | 4 | 519 |
| | | | 5 | 520 |

As is apparent from Table 3, the deviation of the temperature coefficient of resistance among different lots is of the order of from 0.2 to 0.3 percent, which indicates extremely good uniformity, particularly in comparison with deviations of 5 to 10 percent in the case of conventional Cu-Ni alloys.

Thus, the strain gauge according to the present invention has numerous advantages, the principal of which are as follows:

(1) A large gauge factor can be obtained.

(2) The temperature coefficient of resistance is relatively low.

(3) Deviations of characteristics of products in one production lot or products of different lots are much lower than those of known strain gauges. Therefore, manufacture is simplified and facilitated.

(4) Resistance against oxidation and corrosion is good.

(5) The filament material can be readily soldered and brazed.

(6) Workability is relatively good, the alloy material being workable into thin wire and foil.

(7) The resistivity is of a suitable value.

(8) Since the tensile strength is substantially high, the proportional limit is accordingly high, whereby large strains can be measured.

The strain gauge of the invention has further excellent characteristics and is applicable to a wide range of uses.

What I claim is:

1. A mechano-electrical strain gauge having at least one filament made of a ternary allow which consists essentially of 20–60 atomic percent platinum, 20–60 atomic percent palladium, and 5–30 atomic percent iridium.

2. The mechano-electrical strain gauge as defined in claim 1, wherein said filament is in the form of a foil.

3. The mechano-electrical strain gauge as defined in claim 1, wherein said filament is in the form of wire.

References Cited by the Examiner

UNITED STATES PATENTS

| 2,390,038 | 11/1945 | Ruge | 338—3 |
| 2,406,172 | 8/1946 | Smithells. | |
| 2,548,592 | 4/1951 | De Michele. | |
| 2,819,162 | 1/1958 | Cohn et al. | |
| 2,861,114 | 11/1958 | Nishimura. | |
| 3,079,575 | 2/1963 | Singdale et al. | 338—2 |
| 3,202,951 | 2/1965 | Krinsky | 338—2 |
| 3,242,449 | 3/1966 | Stedman | 338—2 X |

RICHARD M. WOOD, *Primary Examiner.*

W. D. BROOKS, *Assistant Examiner.*